Jan. 26, 1960 W. J. HABGOOD 2,922,265

MACHINE FOR TAPING OBJECTS ON CARDS

Filed Dec. 23, 1957 14 Sheets-Sheet 1

INVENTOR.
WARREN J. HABGOOD
BY
Caesar and Rivise
ATTORNEYS.

INVENTOR.
WARREN J. HABGOOD
BY
Caesar and Rivise
ATTORNEYS.

Jan. 26, 1960 W. J. HABGOOD 2,922,265

MACHINE FOR TAPING OBJECTS ON CARDS

Filed Dec. 23, 1957 14 Sheets-Sheet 3

INVENTOR.
WARREN J. HABGOOD
BY
Caesar and Rivise
ATTORNEYS.

MACHINE FOR TAPING OBJECTS ON CARDS

Filed Dec. 23, 1957

INVENTOR.

WARREN J. HABGOOD
BY
Caesar and Rivise
ATTORNEYS.

MACHINE FOR TAPING OBJECTS ON CARDS

INVENTOR.
WARREN J. HABGOOD
BY
Caesar and Rivise
ATTORNEYS.

Jan. 26, 1960 W. J. HABGOOD 2,922,265

MACHINE FOR TAPING OBJECTS ON CARDS

Filed Dec. 23, 1957 14 Sheets-Sheet 6

INVENTOR.
WARREN J. HABGOOD
BY
Caesar and Rivise
ATTORNEYS.

INVENTOR.
WARREN J. HABGOOD
BY
Caesar and Rivise
ATTORNEYS.

INVENTOR.
WARREN J. HABGOOD
BY
Caesar and Rivise
ATTORNEYS.

Jan. 26, 1960 W. J. HABGOOD 2,922,265
MACHINE FOR TAPING OBJECTS ON CARDS
Filed Dec. 23, 1957 14 Sheets-Sheet 9

INVENTOR.
WARREN J. HABGOOD
BY
Caesar and Rivise
ATTORNEYS.

Jan. 26, 1960 W. J. HABGOOD 2,922,265

MACHINE FOR TAPING OBJECTS ON CARDS

Filed Dec. 23, 1957 14 Sheets-Sheet 10

INVENTOR.

WARREN J. HABGOOD

BY

Caesar and Rivise

ATTORNEYS.

INVENTOR.
WARREN J. HABGOOD
BY
Caesar and Rivise
ATTORNEYS.

Jan. 26, 1960 W. J. HABGOOD 2,922,265

MACHINE FOR TAPING OBJECTS ON CARDS

Filed Dec. 23, 1957 14 Sheets-Sheet 12

INVENTOR.
WARREN J. HABGOOD
BY
Caesar and Rivise
ATTORNEYS.

INVENTOR.
WARREN J. HABGOOD
BY
Caesar and Rivise
ATTORNEYS.

Jan. 26, 1960 W. J. HABGOOD 2,922,265

MACHINE FOR TAPING OBJECTS ON CARDS

Filed Dec. 23, 1957 14 Sheets-Sheet 14

INVENTOR.

WARREN J. HABGOOD

BY

Caesar and Rivise

ATTORNEYS.

United States Patent Office 2,922,265 Patented Jan. 26, 1960

2,922,265

MACHINE FOR TAPING OBJECTS ON CARDS

Warren J. Habgood, Millbourne, Pa.

Application December 23, 1957, Serial No. 704,787

32 Claims. (Cl. 53—73)

This invention relates to a machine for wrapping adhesive or pressure sensitive tape around an object and attaching it to another object or card, as for example the attachment on backing or display cards of such objects as emery boards, containers of dental floss, nasal inhalers and chap sticks and packages of razor blades. The machine may also be used to reinforce and close the open edge of a rectangular cardboard for holding records, and the like.

Heretofore the wrapping of tape around an object and onto a card was primarily done by hand. The one machine now commercially available which attempts to do this mechanically has many disadvantages. In this machine the tape is fed horizontally above the object and card and is completely cut off prior to wrapping. Because the tape is unsupported or gravitationally free for a period before it contacts and is wrapped around the object, the wrapping becomes erratic and inaccurate and frequently fails.

The primary object of the invention is to provide a machine which automatically wraps tape around an object and attaches it to a card in such a manner as to overcome the disadvantages noted hereabove.

Another object of the invention is to provide a mechanism which feeds an adjusted predetermined length of tape and which supports and controls the tape throughout the entire wrapping procedure.

Another object of the invention is to provide a mechanism as described in which recoil of the tape is prevented after its severance.

Another object of the invention is to provide a mechanism wherein the tape can be changed without stopping the machine.

Another object of the invention is to provide a mechanism wherein no tape is fed from the tape applying member unless there is an object in position to be taped, the mechanism automatically resuming operation when an object does come into position for taping.

Another object of the invention is to provide a mechanism wherein the taped object is supported and controlled even during the ejection stage.

Another object of the invention is to provide a mechanism wherein a plurality of objects to be wrapped are held under compression during the wrapping stage.

A further object is to provide a machine of the character described in which substantially all of the vital operating parts are above the objects and removed from their travel so that if an object or portion thereof should fall, the vital operating parts will not be injured.

These and other objects will become more apparent as the following description proceeds in conjunction with the accompanying drawings, wherein.

Specific reference is now made to the drawings, similar reference characters being used for corresponding elements throughout.

Figure 1:
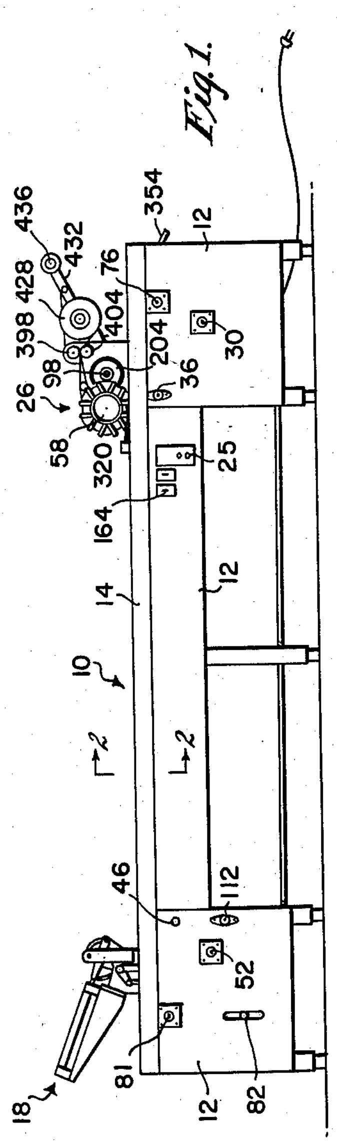
Fig. 1 is a side elevation of the entire machine.
Figure 4:
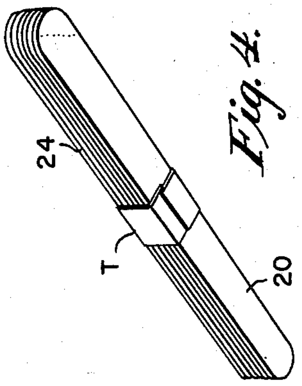
Fig. 4 is a perspective of a group of articles wrapped by the machine.
Figure 3:
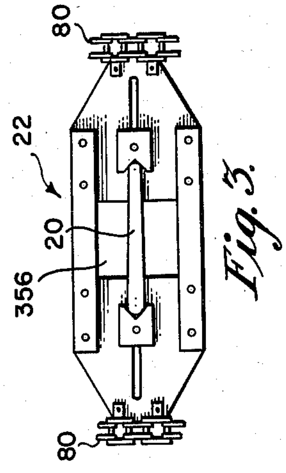
Fig. 3 is a section taken on line 3—3 of Fig. 2.
Figure 2:
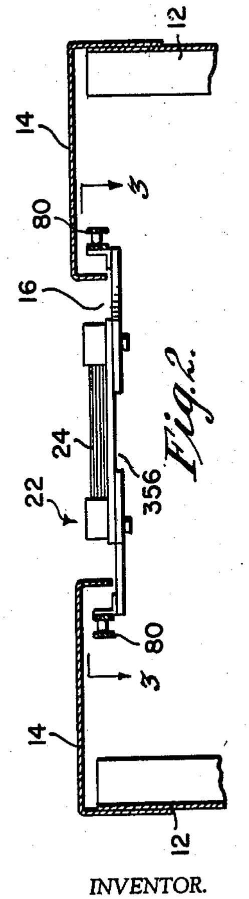
Fig. 2 is an enlarged section taken on line 2—2 of Fig. 1.

The overall machine is indicated at 10, Fig. 1, the housing of which includes a skin 12 constituting the side and end plates and a top cover plate 14 with an open central longitudinal passageway 16, as shown in Fig. 2. At the feed end, the machine includes a magazine 18 which feeds cards or equivalent articles 20 to the carriers 22 of a conveyor, the carriers moving in the open passageway 16 of the top cover plate 14. As the conveyor moves along, an operator feeds objects, shown as emery boards 24 for illustrative purposes only, to be taped on the cards 20. The objects and card then arrive at a taping dial 26 where tape T is applied around the objects and card which are then discharged at the end of the machine opposite the card magazine 18.

Figures 5, 6:
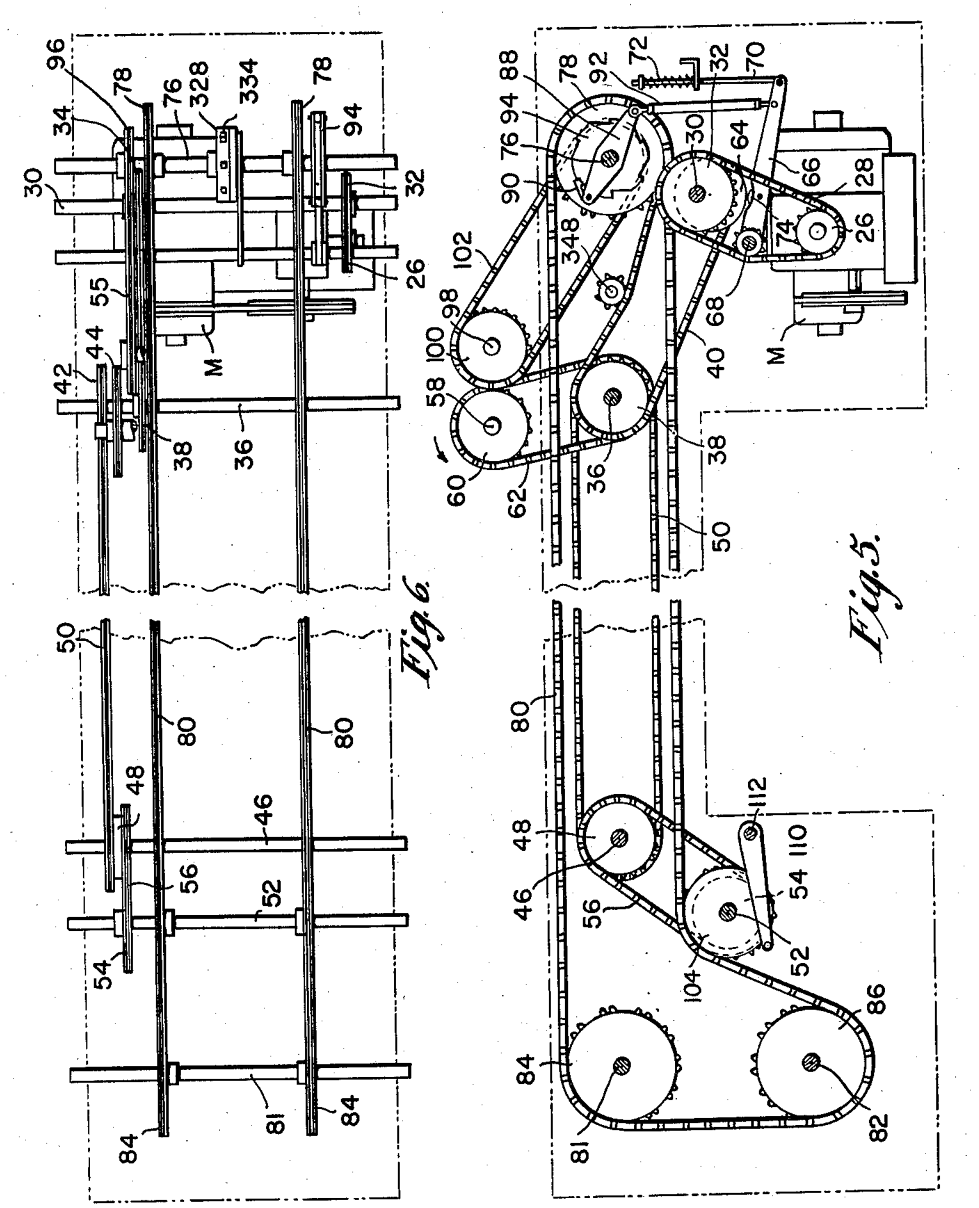
Fig. 5 is a side view of the motivating mechanisms, all other parts being excluded for the sake of clarity.
Fig. 6 is a plan view of the mechanisms as shown in Fig. 5.
Figure 16:
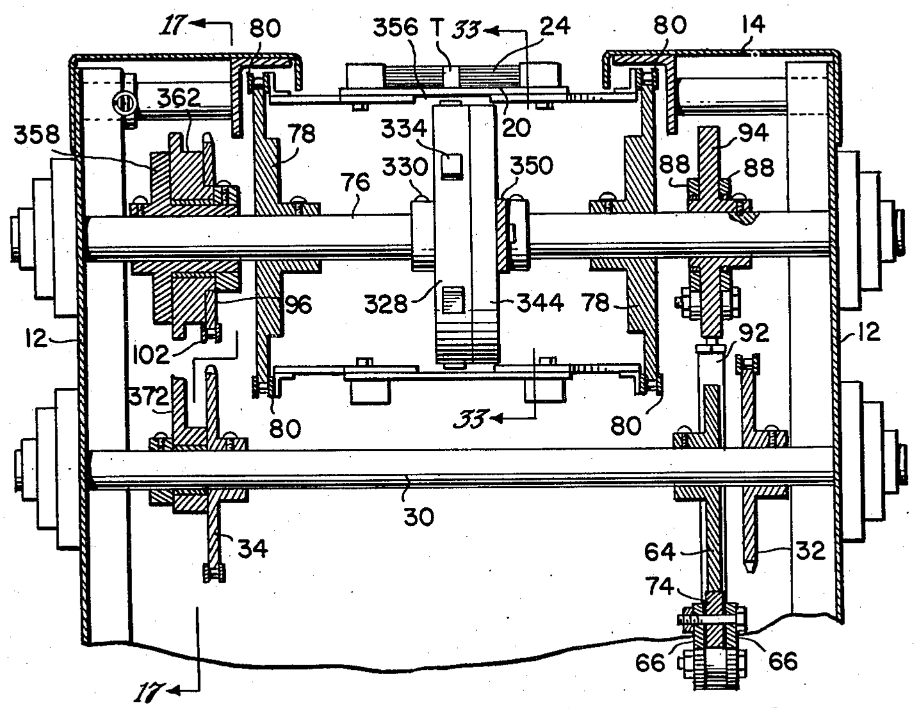
Fig. 16 is a section taken on line 16—16 of Fig. 12.
Figures 17, 18:
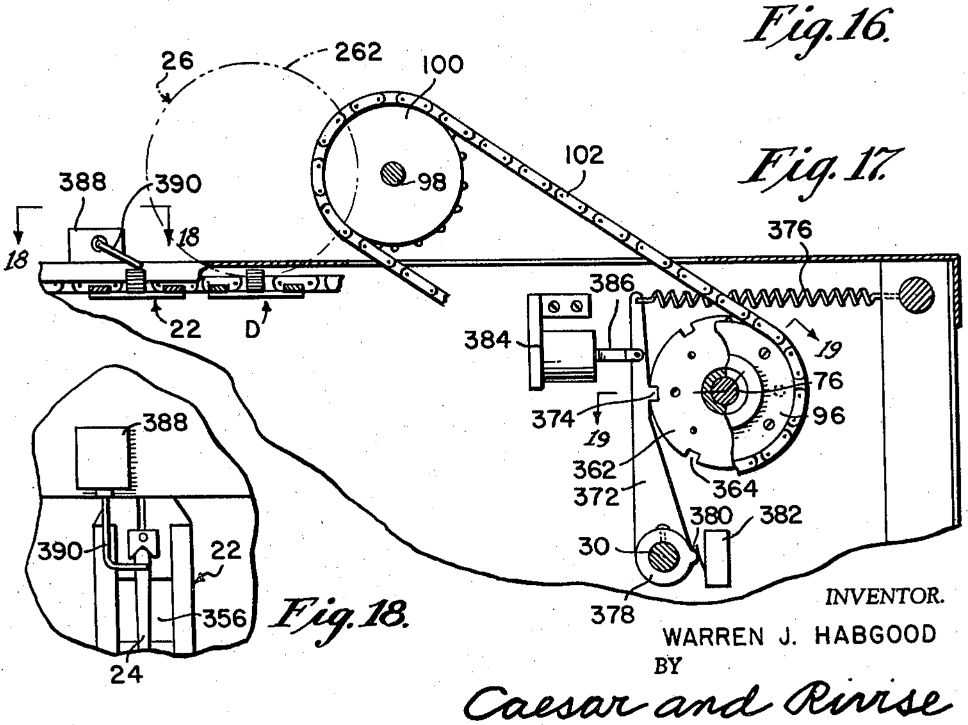
Fig. 17 is a section taken on line 17—17 of Fig. 16.
Fig. 18 is a view looking from line 18—18 of Fig. 17.
Figures 19, 20:
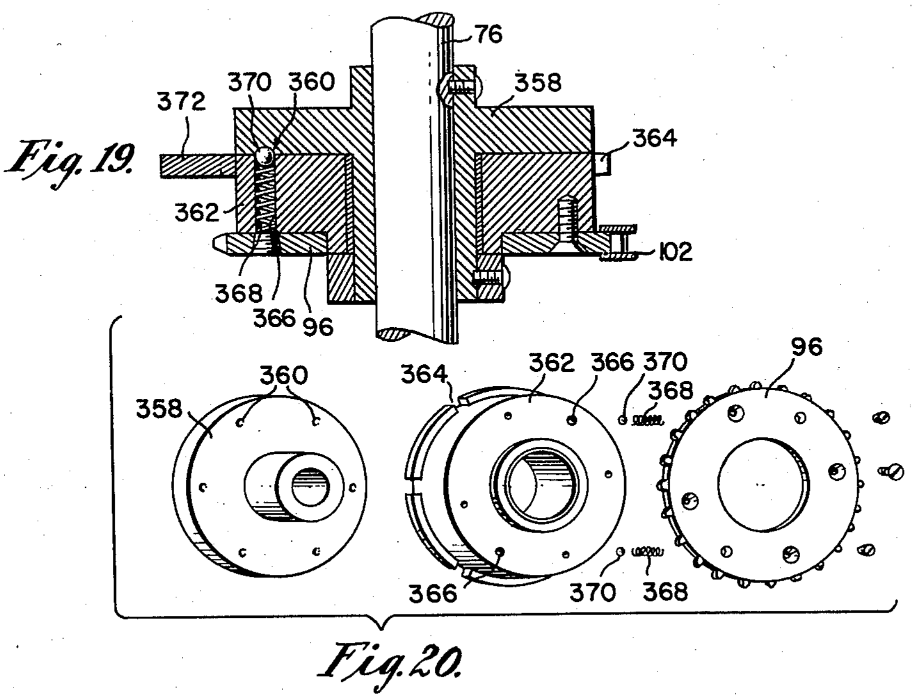
Fig. 19 is a section taken on line 19—19 of Fig. 17.
Fig. 20 is an exploded perspective view of the clutch mechanism shown in Fig. 19.

Attention is here called particularly to Figs. 5 and 6 where the various shafts and motivating parts are clearly shown. A motor M operated by switch 25 is mounted in the housing preferably adjacent the discharge end. By appropriate belt and pulley connection, the motor drives a gear reducer sprocket 26 (preferred reduction 10 to 1) over which is entrained a chain 28. The main drive shaft 30 extends laterally of the housing and is journaled in opposite side plates 12 as shown in Fig. 16. Towards one longitudinal face of the machine, the main drive shaft 30 carries a sprocket 32 over which is entrained the chain 28 from sprocket 26. Towards the opposite longitudinal face of the machine, the shaft 30 carries another sprocket 34 for a purpose soon to appear.

Journaled on opposite side plates of the housing is an intermediate shaft 36 upon which is fixed a sprocket 38. A chain 40 is entrained over sprocket 34 on main shaft 30 and over sprocket 38 to effect a drive connection between said shafts. Shaft 36 is operatively connected to a tape applying mechanism in the taping dial 26, as will appear later. There are two additional sprockets 42 and 44 on shaft 36.

A further intermediate laterally extending shaft 46 is journaled on the side plates towards the feed end of the machine, said shaft having secured thereto a double sprocket 48. A chain 50 is entrained over sprockets 42 and 48. A further transverse shaft 52 is journaled at its ends in the side plates and has secured thereto a sprocket 54, there being a chain 56 entrained over sprockets 48 and 54. The shaft 52 operates the card magazine mechanism as will appear hereinafter.

Associated with the taping dial is a shaft 58 upon which is fixed a sprocket 60, there being a chain 62 which is entrained over sprocket 44 on shaft 36 and sprocket 60.

The main motion proceeds from the motor M through the reducer 26 to the main shaft 30 which rotates at a constant speed, preferably 60 r.p.m. Shaft 30 in turn drives shafts 36 and 58 associated with the taping dial and shaft 52 associated with the card feeding mechanism or magazine. Shaft 30 also imparts indexing or intermittent motion to the conveyor and the taping dial as will now be described.

Shaft 30 has fixed thereon a cam 64. A lever 66 is pivoted at one of its ends as at 68, the other end being secured to a vertical rod 70 which passes through a bracket attached to the machine housing, there being a spring 72 around the rod and interposed between the bracket and the end of the rod, as shown clearly in Fig. 12. The lever 66 carries a roller 74 which is urged against cam 64 by spring 72.

A transverse shaft 76 is journaled in the side plates 12, see Fig. 16, the shaft carrying two sprockets 78 adjacent its ends over which are entrained the conveyor chains 80, the latter being linked to the ends of the carriers 22 in a manner well known in the art. Thus shaft 76 is the conveyor drive shaft. At the feed end of the machine there are journaled upper and lower shafts 81 and 82 upon each of which are secured a pair of idler sprockets 84 and 86 respectively which engage the conveyor chains 80, the chains passing over idlers on the shaft 52.

Mounted on the conveyor drive shaft 76 is a lever 88 one end of which carries a spring urged pivoted pawl 90, the other end of which is adjustably connected by a turnbuckle link 92 to the free end of the lever 66. Fixed to shaft 76 is a ratchet 94, see Fig. 12, whose teeth are engaged by the pawl to drive the ratchet and conveyor shaft 76 in a clockwise direction, the shaft turning intermittently and being indexed by the pawl which is in turn intermittently actuated by the cam 64 on main shaft 30 via the roller 74, the lever 66 and the link 92.

The indexing of the taping dial 26 is accomplished by providing a sprocket 96 on conveyor shaft 76. Rotatably mounted adjacent the taping dial is a shaft 98 which has gearing, later to be described which operates the dial or head. Mounted on shaft 98 is a sprocket 100 and a chain 102 is entrained over sprockets 76 and 100 to effect an indexing connection between conveyor shaft 76 and the taping dial actuating shaft 98.

Referring now to the card dispensing apparatus, more particularly shown in Figs. 7–11, it will be seen that shaft 52 has secured on one end thereof a cam plate 104 which has a groove 106 that is eccentrically cut in the plate. Riding in groove 106 is a roller 108 which is carried intermediate the ends of a lever 110, the latter being fixed upon a rotatable idler shaft 112 which extends transversely of the housing. To balance the mechanism another lever 114 is provided which is like lever 110 but has no roller on it to engage the cam plate 104 on shaft 52. Both levers 110 and 114 are pivoted as at 116 to adjustable vertical rods 118 which pass through the upper housing plate 14.

Figure 7:
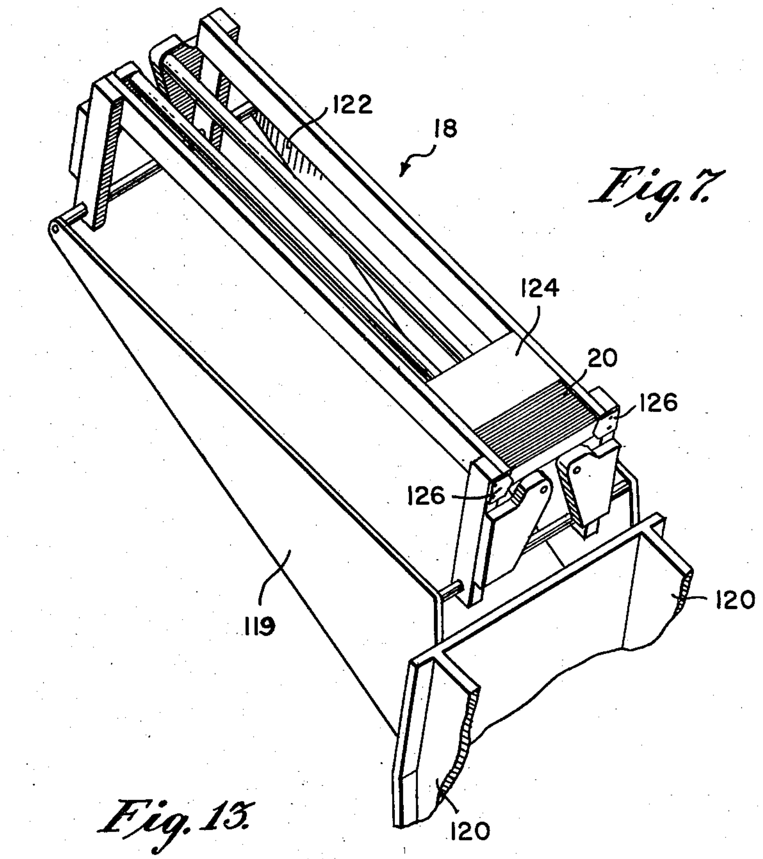
Fig. 7 is a perspective view of the object magazine or dispenser per se.

The card magazine 18, as shown in Fig. 7 may be any suitable mechanism for feeding cards, preferably gravity feed. As shown it consists of upwardly inclined side plates 119 which are connected at their forward ends to brackets 120 that are in turn connected to the upper housing plate 14. The magazine is constructed to form a channel 122 to receive a supply of cards 20 with a weight 124 therebehind. The forward end of the magazine carries spring clips 126 to releasably hold the flexible cards 20.

Figures 8, 11:
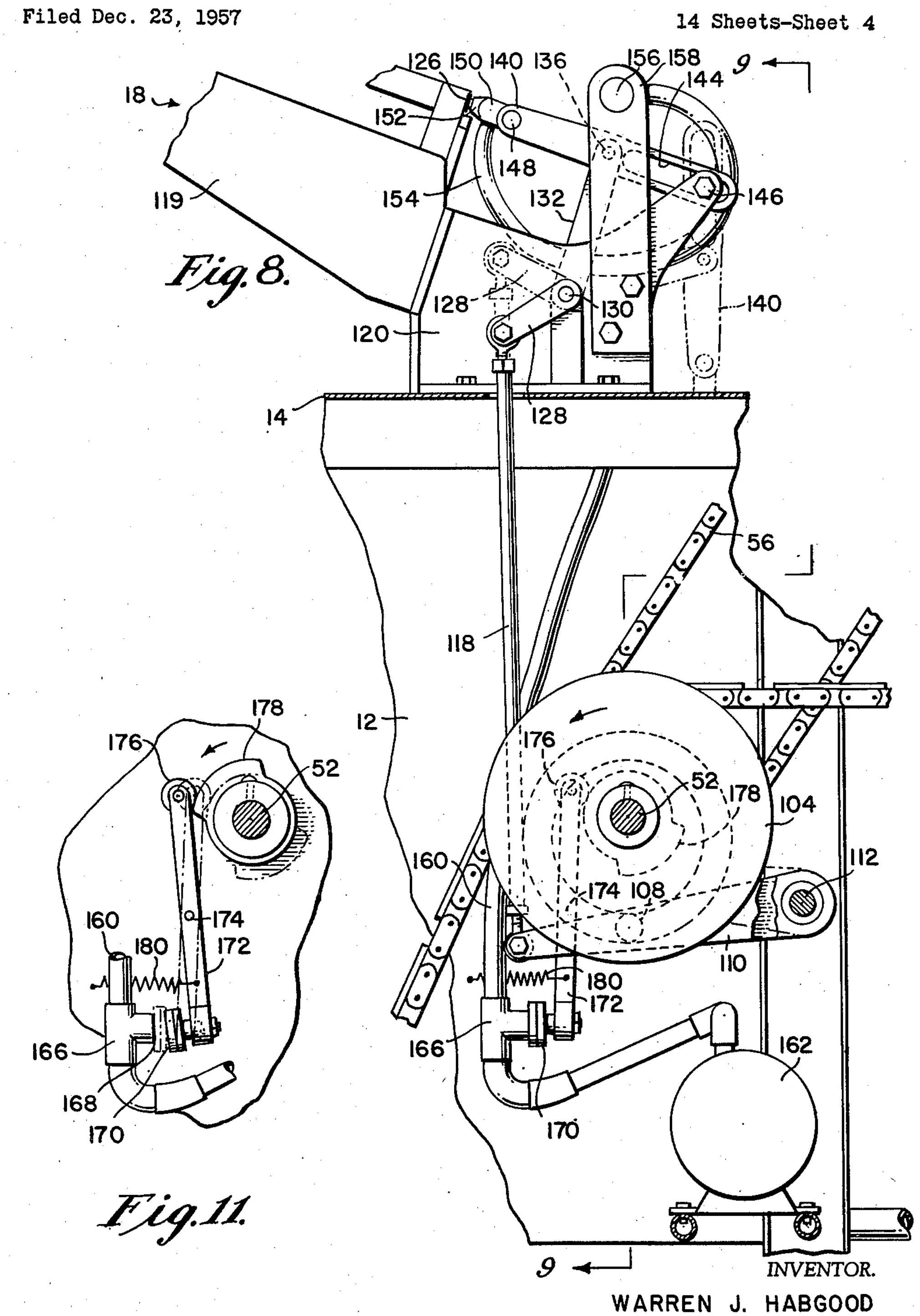
Fig. 8 is an enlarged side elevation of the starting or object dispenser end of the machine with the side plates removed to show details of construction.
Fig. 11 is a section taken on line 11—11 of Fig. 9.
Figures 9, 10:
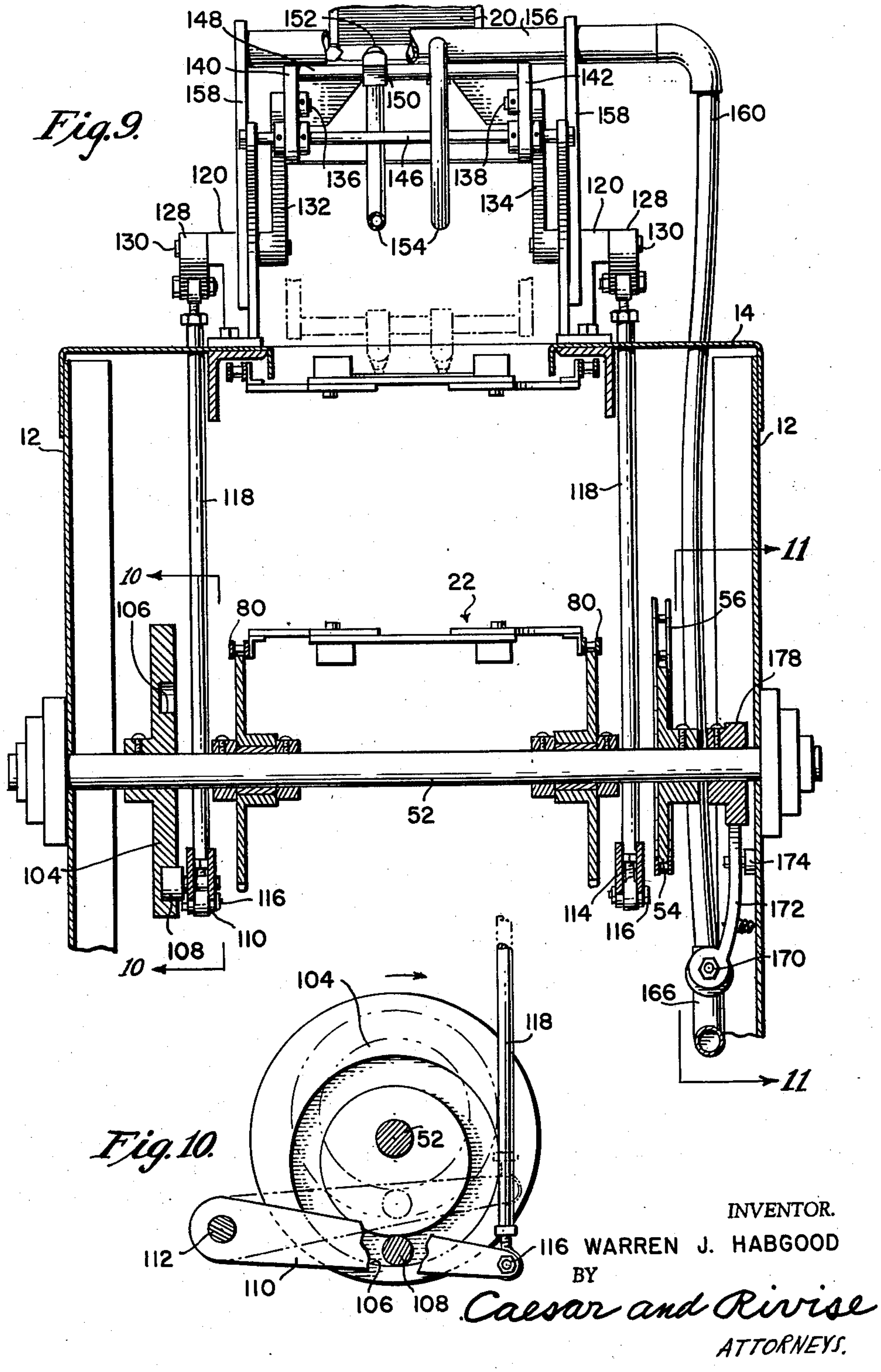
Fig. 9 is a section taken on line 9—9 of Fig. 8.
Fig. 10 is a section taken on line 10—10 of Fig. 9.

The rods 118 at their upper ends are fixed to links 128 which are in turn fixed to stub shafts 130, the latter being journaled in the brackets 120. The shafts 130 are connected on the inside of the brackets 120 to levers 132 and 134 which are pivoted as at 136 and 138 to arms 140 and 142. Each arm has an elongated slot 144, there being a shaft 146 fixed to the brackets 120 and passing through said slots as shown in Fig. 8.

Connecting the arms 140 and 142 is a rod 148 upon which is adjustably mounted a pair of drilled blocks into which are fitted rubber suction cups 152. The cups are connected to hoses 154 which enter a manifold 156, the manifold being carried at the upper ends of vertical extensions 158 of the brackets 120. The manifold is connected by a further hose 160 to a conventional vacuum pump 162 operable by switch 164, Fig. 1. A T fitting 166 is interposed in the hose 160, one arm of which fitting constitutes a valve opening or seat 168. A valve 170 is carried at the end of an arm 172 which is pivoted intermediate its ends as at 174 to an appropriate portion of a side wall 12 of the machine housing. The other end of the arm 172 carries a roller 176 which engages a cam 178 that is keyed upon shaft 52, a spring 180 being operatively connected to the arm and acting to urge the roller 176 against the cam 178 and the valve 170 against the valve seat 168.

It will be noted that cam 178 has diametrically opposed raised and lowered portions for a purpose soon to appear. As the shaft 52 rotates and when the roller 176 bears against a lowered portion of cam 178, the valve 168, 170 is closed and vacuum is being exerted through the cups 152 against a card 20 sufficient to flex it past the magazine spring clips 126 and to hold the card. Shaft 52 continues to rotate whereby the cam 104 acting on roller 108 lifts the vertical rods 118 to the position shown in dotted lines in Fig. 8. This causes arms 140 and 142 to move along the axis of slots 144 and since shaft 146 passes through the slots, the arms 140 and 142 are rotated, while their suction cups 152 carry the card 20, from the solid line to the vertical dotted line position shown in Fig. 8. At this point the roller 176 on lever 172 has reached an elevated portion of cam 178 whereupon the valve 168, 170 opens breaking the vacuum and allowing the card 20 to be released from the cups 152 upon the carrier 22. Continued rotation of shaft 52 causes roller 176 to ride on cam 178 until the next depressed area of the cam is reached whereupon the valve 168, 170 again closes. In the meantime the rods 118 have moved downwardly and the arms 140 and 142 carrying the suction cups 152 have moved to a position again opposite a next card 20 in the magazine, as shown in solid lines in Fig. 8.

Figure 12:
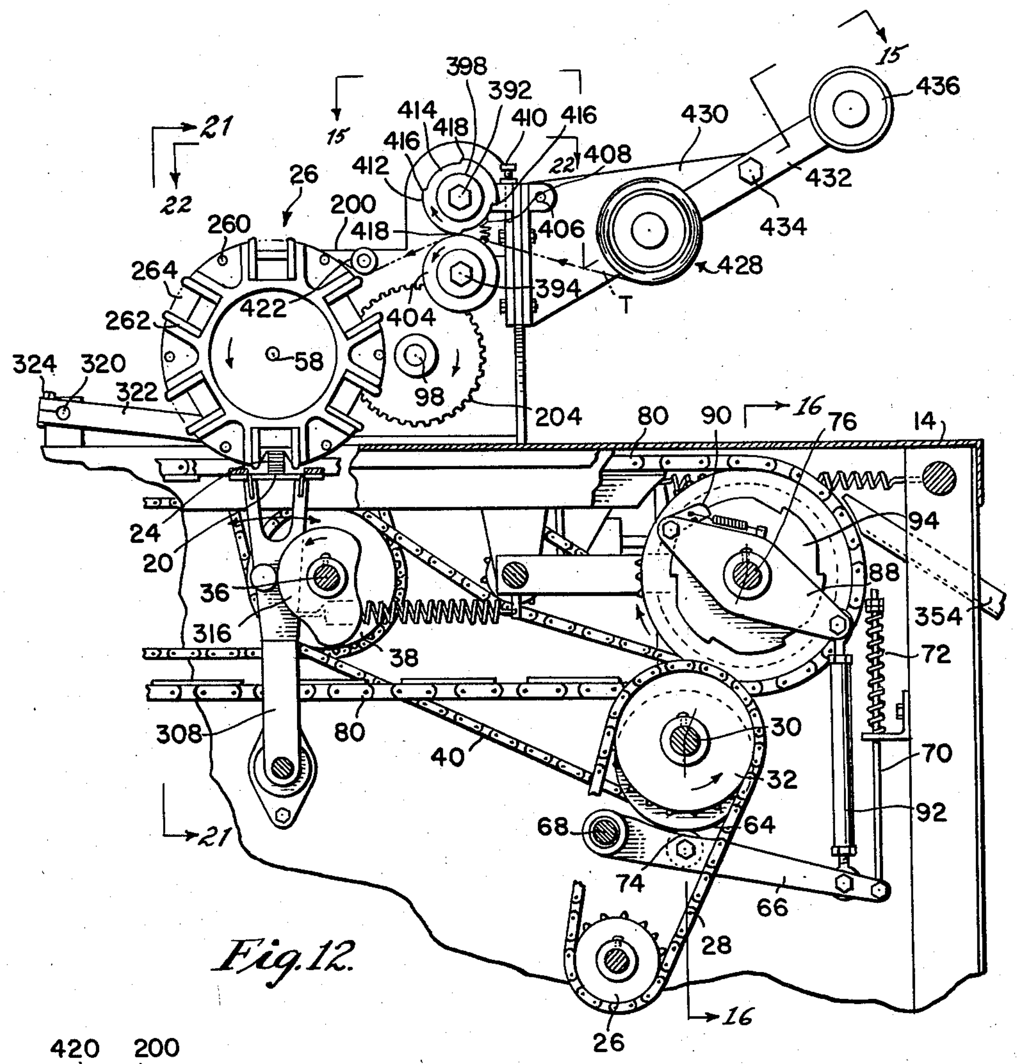
Fig. 12 is a side elevation of the discharge end of the machine with the side plate removed to reveal details of construction.
Figure 21:
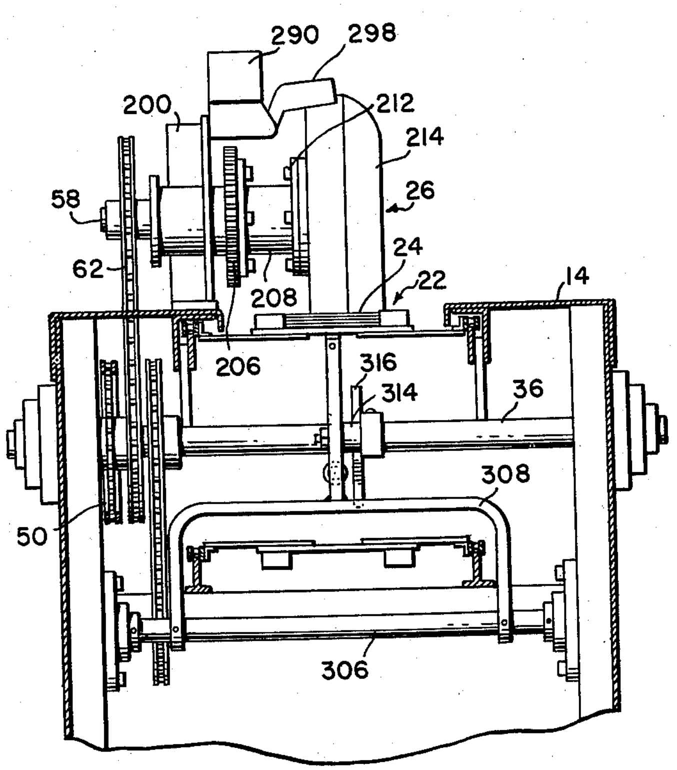
Fig. 21 is a view looking from line 21—21 of Fig. 12.
Figure 22:
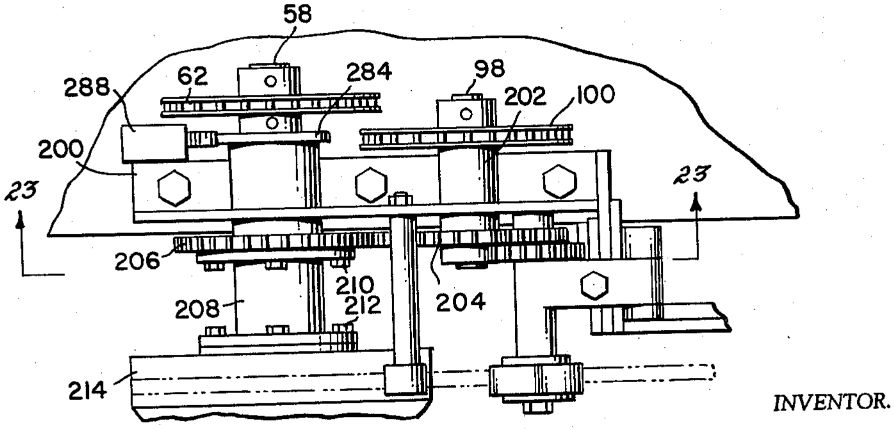
Fig. 22 is a view looking from line 22—22 of Fig. 12.
Figures 25, 26, 27:
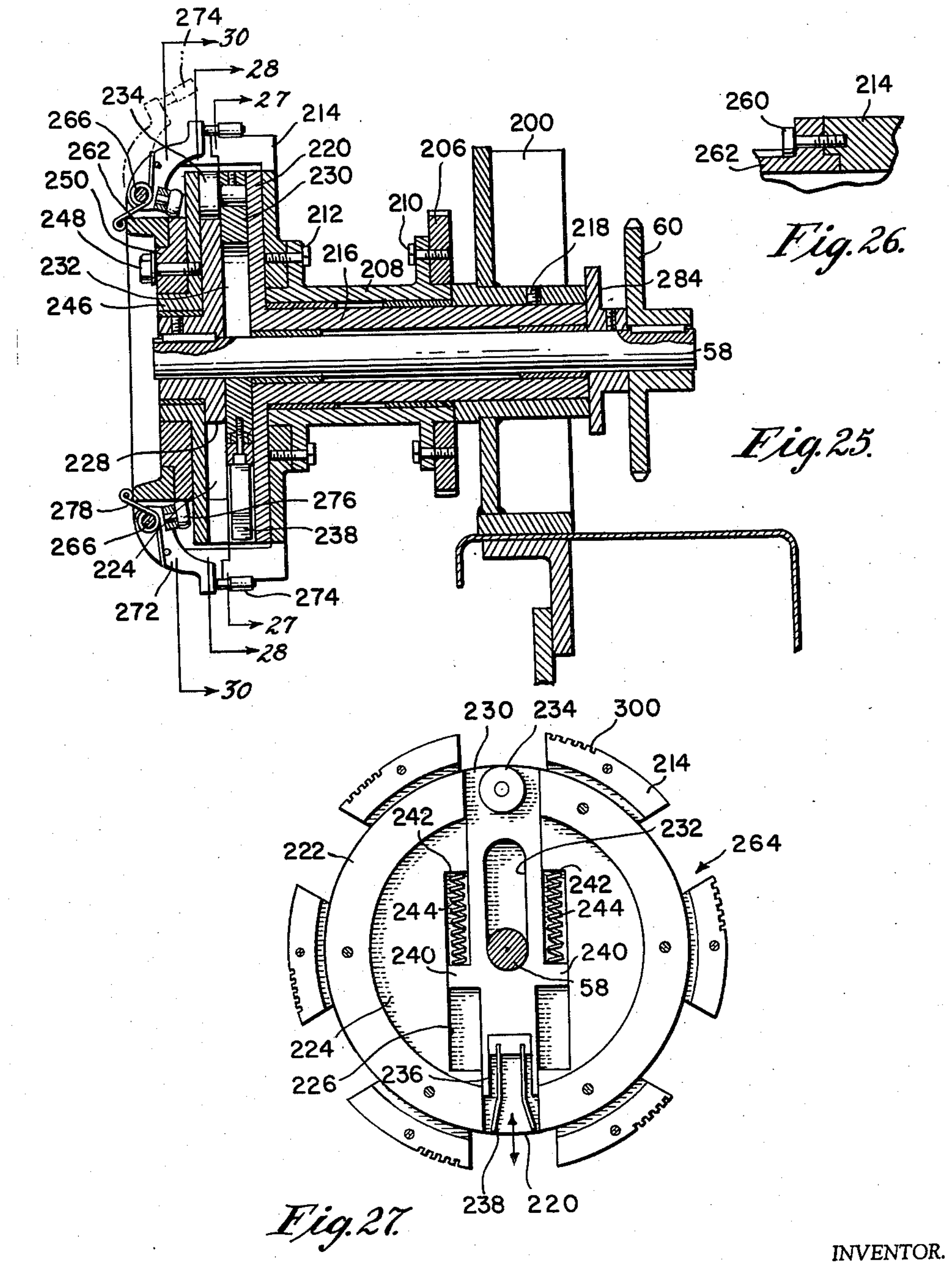
Fig. 25 is a section taken on line 25—25 of Fig. 24.
Fig. 26 is a section taken on line 26—26 of Fig. 24.
Fig. 27 is a section taken on line 27—27 of Fig. 25.

Coming now to the operation of the taping dial or head 26 it will be seen particularly in Figs. 12, 21 and 22 that there is a bracket 200 which is bolted to the top 14 of the machine somewhat in advance of the discharge end, said bracket carrying a bearing 202 which journals shaft 98. On the end of shaft 98 opposite the sprocket 100 is a spur gear 204. A gear 206 is fixed to a flanged hub 208 as at 210, Figs. 22 and 25, and fixed at 212 to the hub is a tape feed dial back plate 214. The gears 204 and 206 mesh whereby the tape feed dial is indexed simultaneously and identically with the conveyor chain 80, off the ratchet and pawl 88 and 90, but the dial rotates in a direction opposite to that of gear 204.

The hub 208 rotates about a stationery sleeve 216 which is fixed to bracket 200 as at 218. The hub is integral with a plate 220 which has a forwardly extending flange 222 that is also cut out to form a diametrically extending channel 226 for a purpose soon to appear.

Figure 28:
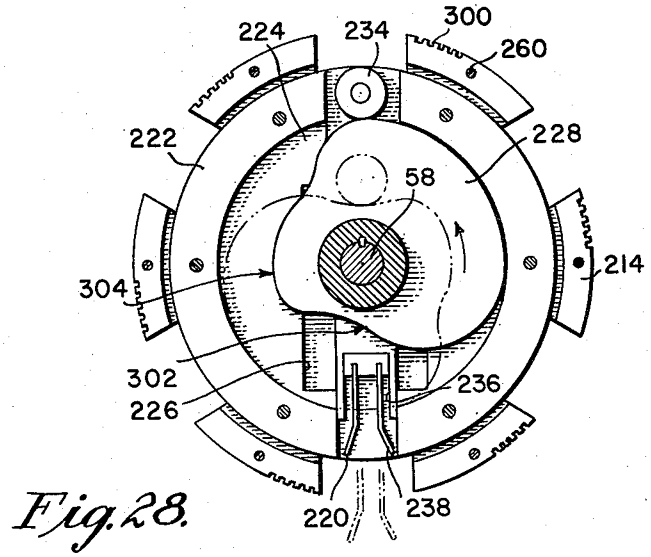
Fig. 28 is a section taken on line 28—28 of Fig. 25.
Figure 29:
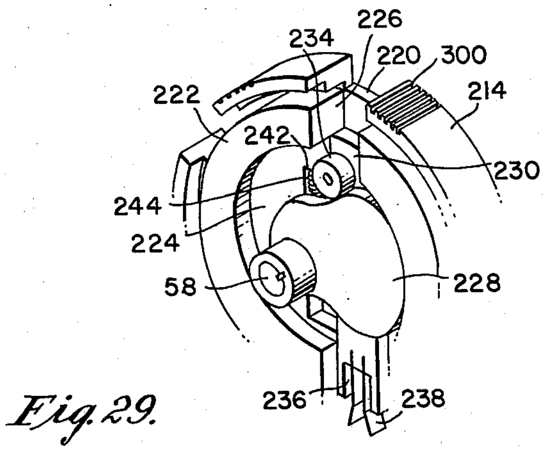
Fig. 29 is a perspective view of parts in taping dial shown in Fig. 28.

Keyed to shaft 58 is a cam 228, Figs. 28 and 29, which is located in the cavity 224. Behind the cam 228 is a diametrically extending plunger in the form of a plate 230 which has a slot 232 centrally thereof to clear the shaft 58. At the top, the plunger carries a roller 234 and at the bottom, the plunger is cut out as at 236. Secured to the plunger and extending through the cut-out 236 is a pair of resilient fingers 238 which are adapted to press the tape T around the object. The plunger 230 has outwardly extending ears 240 intermediate its ends and the flange member 222 has shoulders 242 in the cut-out 226. Springs 244 are contained between shoulders 242 and the ears 240 and urge the plunger in a direction so that the roller 234 bears against the cam face of cam 228.

Figure 30:
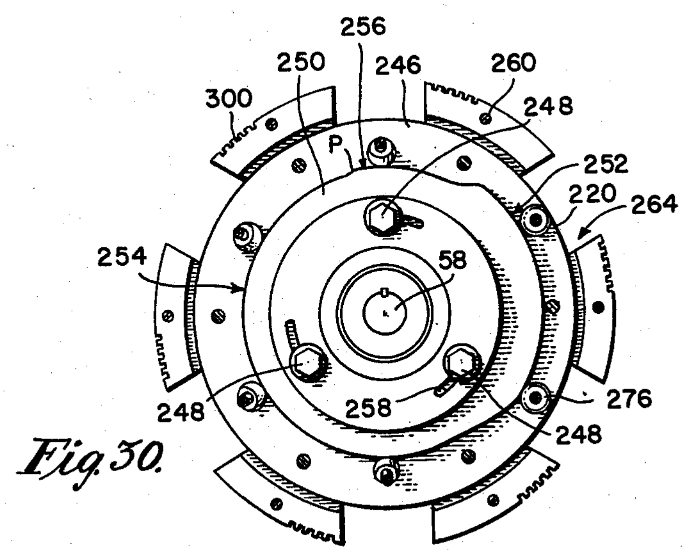
Fig. 30 is a section taken on line 30—30 of Fig. 25.

A cover plate 246, Fig. 30, is provided which is bolted to the flange 222 to contain the plunger mechanism in proper position, the cover plate having a sleeve bushing serving as an outboard bearing for the shaft 58. Bolted on the plate 246 as at 248 is a cam member 250, the cam surface including a high portion 252, a low portion 254 and an intermediate portion 256 for a purpose soon to appear. The cam 250 is slotted as at 258 with the bolts 248 extending therethrough so that the cam is radially adjustable to predetermine the length of tape cut off.

Figure 31:
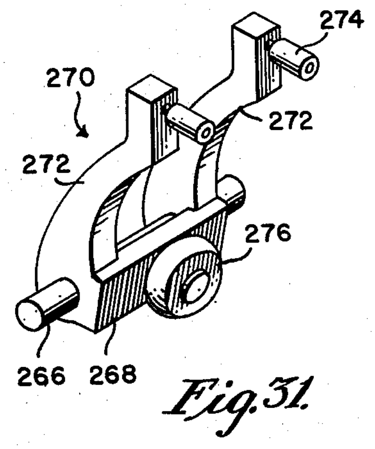
Fig. 31 is a perspective view of the clamping fingers associated with the taping dial.

Attached at suitable points as at 260 to the back plate 214 is a front plate or casting 262 which includes a plurality of circumferentially spaced grooved areas 264 in which are mounted the tape clamping fingers. Each grooved area, in effect, provides a pair of opposed flanges in which are pivotally journaled the ends of a shaft 266 carried by the web portion 268 of a bifurcated member 270 whose legs 272 constitute clamping fingers. The ends of the fingers include rollers 274 and the web portion includes a cam follower 276, see Fig. 31.

Figure 24:
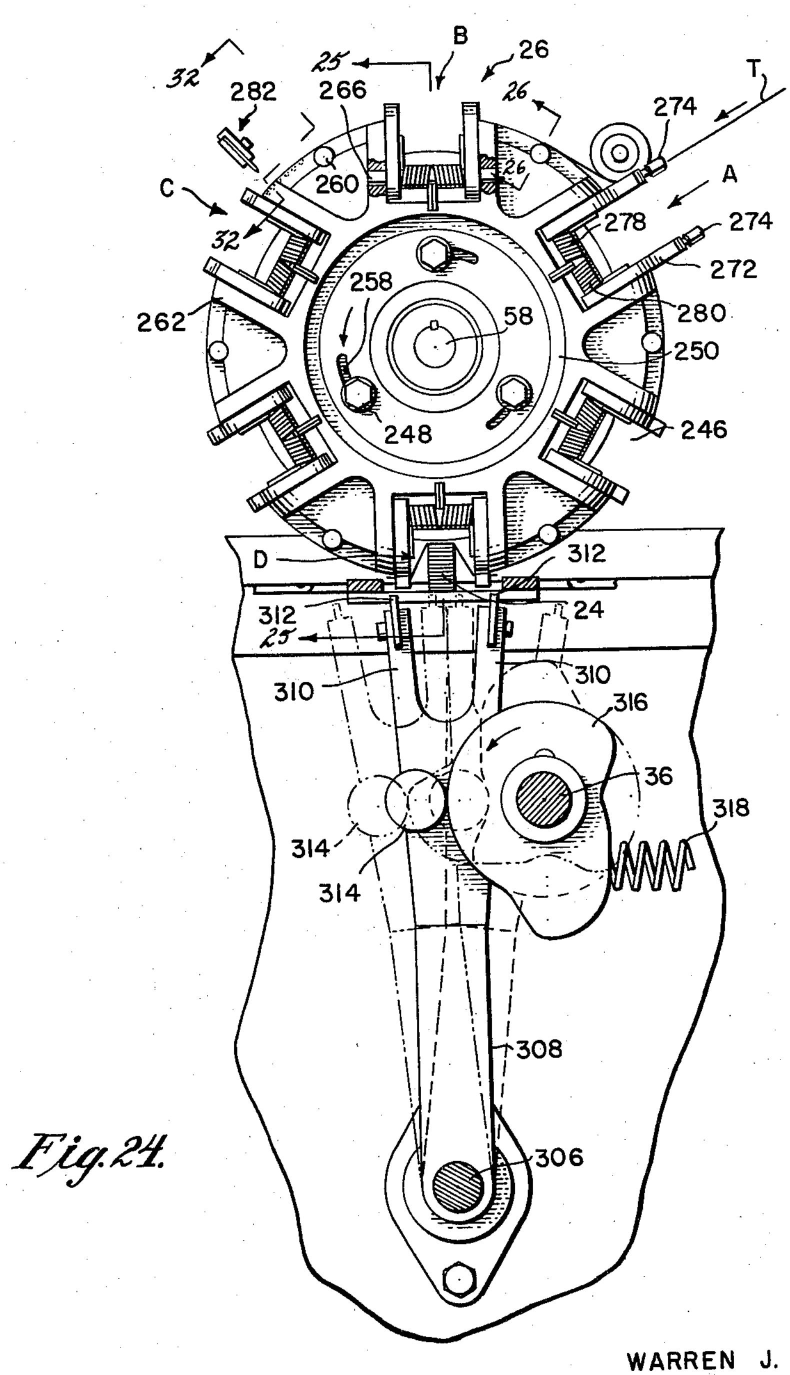
Fig. 24 is an enlarged elevational view of the taping dial.

Left and right hand springs 278 and 280 are wound about the shaft 266, see Fig. 24, and press against the fingers 272 and against the front plate casting 262, the springs urging the finger rollers 274 inwardly against the outer surface of the back dial plate 214.

Each of the cam followers 276 of the clamping fingers engages the outer surface of the cam member 250 which member is stationary as the clamping fingers rotate about the same. When one of the cam followers 276 engages the high cam surface 252, the clamping finger assembly 270 is caused to rotate so that the rollers 274 clear the tape T and become positioned over instead of under the tape as shown at the right hand side of Fig. 24 at location A. After clearance of the tape, the fingers rotate back to a position where the cam follower 276 engages the intermediate cam surface 256. At this point the rollers 274 just touch but do not apply pressure to the outer adhesive side of the tape thus acting to guide the tape and limit its axial swaying movement. This position is shown at B at the top of Fig. 24.

The cam follower 276 moves on the cam surface 256 until it reaches the point P which is the juncture of the intermediate cam surface 256 and the low surface 254. It is at this point that the rollers 274 positively grip the tape which spans the grooved area 264 between adjacent elevated areas on back plate 214. The tape is carried to position C on Fig. 24 where it is cut off by the knife mechanism 282 to a predetermined length which can be controlled by adjusting the point P. This is effected by the screws 248 and slots 258.

Figure 32:
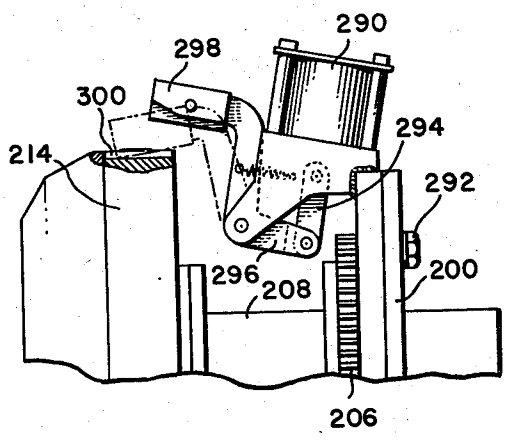
Fig. 32 is a view looking from line 32—32 of Fig. 24.

Adjustably fixed to the shaft 58 is a cam plate 284 which engages a switch 288, Fig. 22, that is mounted on the bracket 200. The switch is operatively connected by conductive wires to a solenoid 290, Fig. 32, adjustably mounted as at 292 upon bracket 200, the solenoid being linked as at 294 to a cantilever 296. The cantilever is pivoted at its corner and carries at its free end a knife or razor blade 298. The elevated portions of the back plate 214 includes spaced knife or blade receiving grooves 300. At a predetermined position or dwell cycle of the taping dial, the cam 284 contacts the switch 288 which energizes the solenoid 290 causing the cantilever 296 to rock and the blade 298 to cut the tape T and enter a pre-selected blade groove 300.

After the desired length of tape is cut off it is carried by one of the clamp assemblies to the position D on Fig. 24 where the tape is over the top of the objects to be wrapped, it being understood that the objects 24 have previously been placed over the cards 20 in the conveyor carriers 22 by the operator as the conveyor carriers have moved from the card feed magazine 18 to the taping dial 26. The outside diameter of the taping dial is the same as the pitch diameter of the conveyor chain drive sprocket 78 which imparts to the conveyor chain 80 a linear speed equivalent to the radial velocity of the taping dial thus allowing registry of the grooved area 264 centrally with the objects in the carrier 22 so that the tape T across the grooved area is in proper position for wrapping.

When the tape at position D has engaged the top of the objects, the plunger roller 234 is in a position to engage the low point or area 302, Fig. 28, of the cam 228 whereupon the plunger also drops and the resilient fingers 238 wipe the tape around the sides of the objects and remove the tape from the clamping fingers. The plunger fingers 238 now extend below the bottom of the objects whereupon the plunger roller 234 engages the intermediate surface 304 of the cam 228 and partially raises the plunger fingers 238 to the bottom of the objects. It dwells at this position until the tape ends are overlapped at the bottom of the objects.

The overlapping of the tape ends is accomplished as follows. As seen in Figs. 21 and 24, a shaft 306 is pivotally journaled at its ends below the shaft 36 and fixed to it is a yoke lever 308 whose upper end is bifurcated to form legs 310 which carry flexible wiper elements 312. Intermediate its ends the lever 308 carries a cam follower 314 which bears against a cam member 316 keyed upon shaft 36, the spring 318 serving to urge the cam follower 314 against the cam 316. The action is such that the lever 308 oscillates in one direction at dwell to wipe one tape end and oscillates in the other direction to wipe the other tape end.

Figure 13:
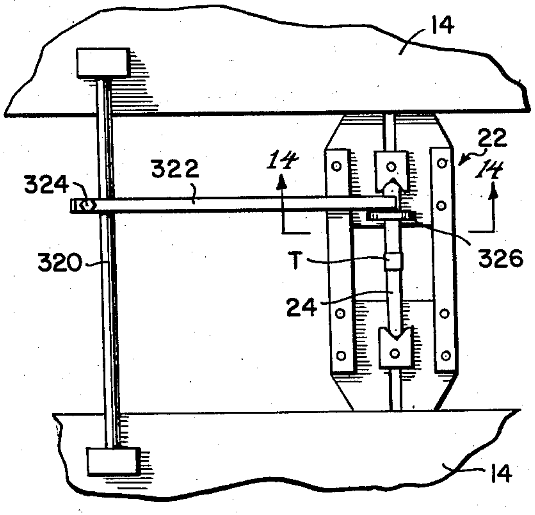
Fig. 13 is a plan view of the means to compress the objects to be taped at the taping station.
Figure 14:
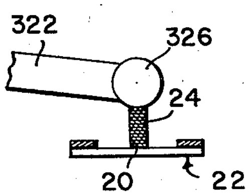
Fig. 14 is a section taken on line 14—14 of Fig. 13.

As shown in Fig. 13, a fixed shaft 320 is mounted between the longitudinal top plates 14 and across the conveyor. An arm 322 is provided which is split at one end and there clamped as at 324 to the shaft 320, the arm being thereby adjustable angularly and axially of the shaft. The free end of the arm 322 carries a roller 326. The roller is located directly beneath the wrapping station D of the tape feed dial and bears against the top of the piled objects 24 while the latter are being taped as a unit to compact the objects and thereby obtain a tight wrap.

A circular ejector plate 328 is provided, see Figs. 33–36, which has a central hub that is secured as at 330 centrally to the conveyor shaft 76, the plate including circumferentially spaced, radial channels 332 in which are slidably mounted ejector bars 334, there being a spring 336 in each channel normally urging the bars 334 radially outwardly of the plate. The inside face of the plate includes radial slots 338 through which extend bolts 340 which are fixed to the plungers 334 and which carry cam followers 342 on the outside of the inner face of the plate 328.

Figures 33, 34, 35, 36:
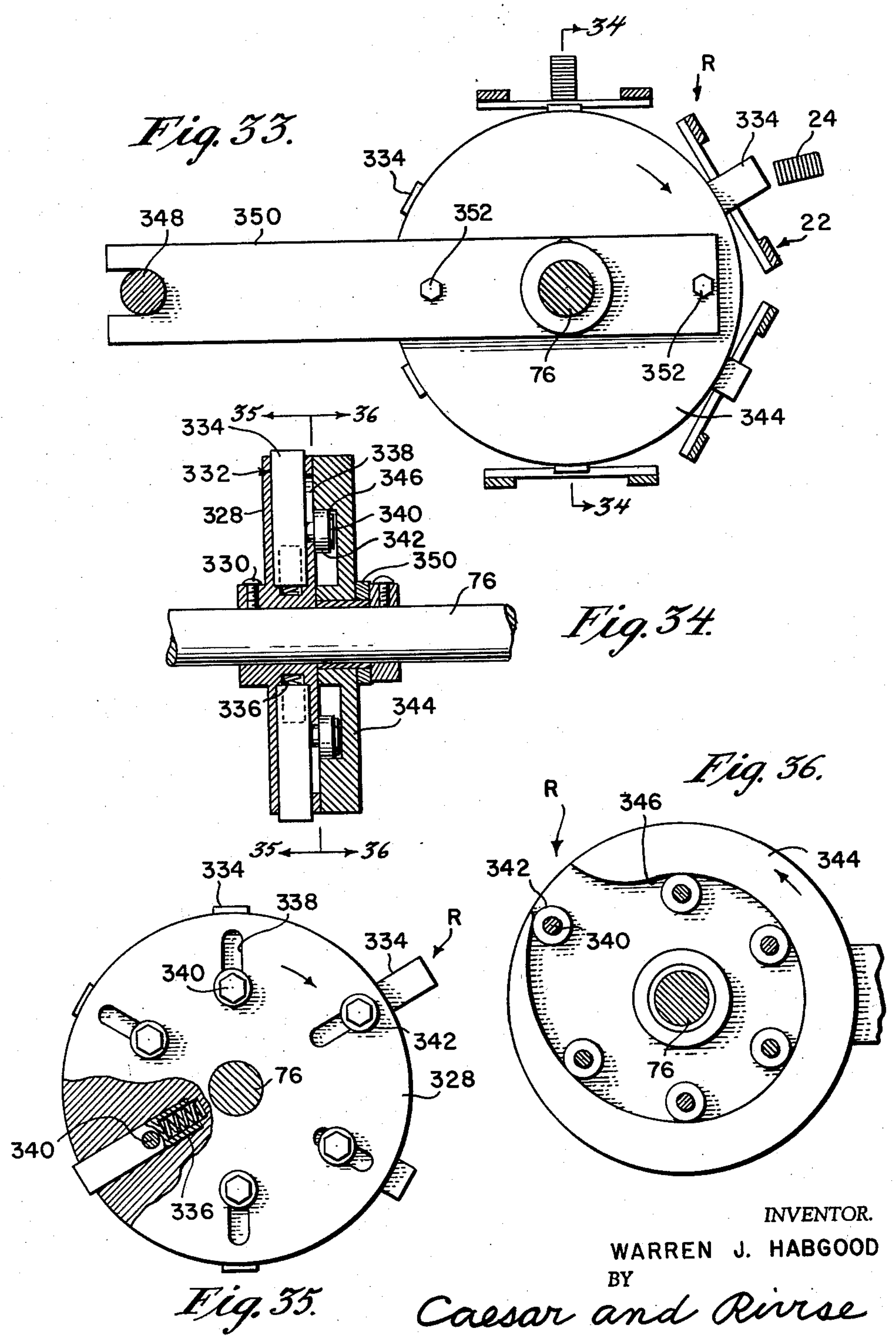
Fig. 33 is a section taken on line 33—33 of Fig. 16.
Fig. 34 is a section taken on line 34—34 of Fig. 33.
Fig. 35 is a section taken on line 35—35 of Fig. 34.
Fig. 36 is a section taken on line 36—36 of Fig. 34.

A further plate 344 is idled upon the conveyor shaft 76, the inner face of which includes a cam track 346 which is engaged by the plunger rollers 342, as shown clearly in Figs. 34 and 36. A rod 348 is fixedly mounted on the frame and a longitudinal bar 350 straddles the rod 348 at one end, Fig. 33, and is bolted at its other end as at 352 to the plate 334, the bar freely receiving the shaft 76. The bar 350 prevents rotation of the plate 344 around the shaft 76.

The ejector is located adjacent the discharge end of the conveyor where the frame carries an inclined chute 354. After the objects have been taped and are carried by the conveyor to the discharge end they pass over the plates 328, 344, as shown in Figs. 16 and 33. At every position save the first return position R, Fig. 33, the plunger rollers 342 engage the cam track 346 whereby the plungers 334 are retained in an inward or non-ejecting position. At the first return position R, the cam roller 342 of a particular plunger is at the widest portion of the cam track 346, whereby the spring 336 urges the plunger 334 outwardly through a cavity 356 in the conveyor carrier 22 to eject the objects 24 from the carrier into the chute 354.

A mechanism is provided whereby the taping dial does not feed tape at the wiping station D unless there is an actual object to be taped one index position prior to station D. This mechanism comprises the following as shown particularly in Figs. 16–20 and 23. Fixed to the conveyor shaft 76 is a circular plate 358 which is provided with circumferentially spaced recesses 360 corresponding in number and spacing to the teeth on rachet member 94. Free to rotate on the hub of the plate 358 is a flanged hub 362, the bores receiving springs 368 and balls 370 which are urged by the springs into engagement with the recesses 360. When the balls are engaged in the recesses clutch engagement is affected creating a positive drive between the shaft 76 and the taping dial.

Mounted freely on the main drive shaft 30 is a lever bar 372 having a tooth 374 towards its upper end which is urged into engagement with a notch 364 in hub 362 by means of a spring 376. When the tooth 374 engages the notch 364 it acts to restrain the hub member 362 thereby disengaging the clutch and breaking the drive connection to the taping dial.

Fixedly mounted on the main drive shaft 30 is a cam 378 having a point 380 at a predetermined position adapted to close a micro switch 382 mounted on the frame. The switch 382 is operatively connected to a solenoid 384 which is in turn operatively connected by a link 386 to lever 372. Mounted on the frame near the taping dial one index in advance of position D is another micro switch 388 which is connected in series to the solenoid 384. The switch arm 390 is normally down keeping the switch contacts open and in this position, the solenoid is not energized, the tooth 374 of the lever 372 engages notch 364 causing clutch disengagement and the taping dial will not index. This occurs when no object is beneath the switch arm 390. When an object to be taped does come along to the position of the switch 388 it contacts the arm 390, raises it and causes the switch contacts to close. Just previous to the next index, the point 380 of cam 378 causes the contacts of switch 382 to close, thereby closing the circuit to and energizing solenoid 384. This pulls the tooth 374 out of engagement with the notch 364 on the hub 362 causing clutch engagement and drivingly connecting the taping dial to conveyor drive shaft 76.

Figure 23:
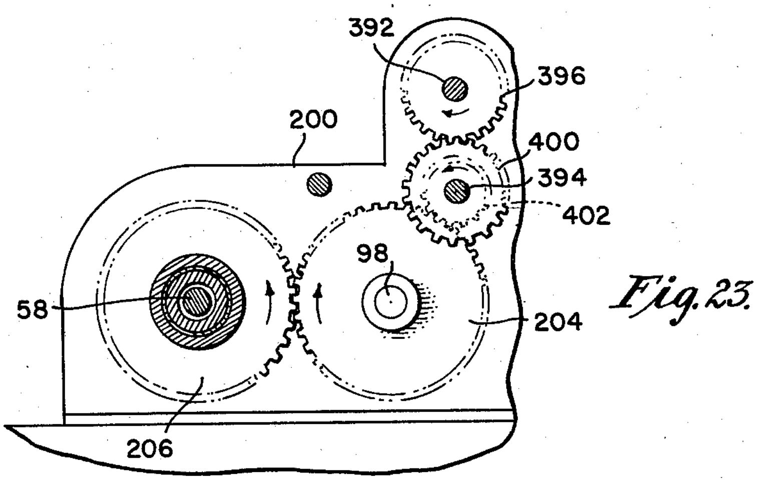
Fig. 23 is a section taken on line 23—23 of Fig. 22.

A tape feeding mechanism is provided, see Figs. 12, 13, and 23, which is synchronized with the movement of the taping dial, which feeds a predetermined length of tape, which restricts recoil of the tape when it is cut off and which allows replenishment of tape without necessitating stoppage of the machine. Fixed upon bracket 200 is a pair of vertically spaced stub shafts 392 and 394. Rotatably mounted upon shaft 392 is a hub member having a gear 396 at one end and a tape metering roller 398 at its other end. Rotatably mounted upon the shaft 394 is a hub member having a gear 400 which meshes with gear 396, another gear 402 which meshes with taping dial gear 204 and a tape feed roller 404 at the other end of the hub. The hub member on shaft 392 is pivoted as at 406 to the bracket and a tension spring 408 is connected between said hub member and the one on the lower shaft 394. A set screw 410 is provided for adjusting the contact pressure between the rollers 398 and 404.

While roller 404 is a full circumfrence roller, roller 398 is not. The circumfrenece of said roller 398 has two diametrically opposed elevations 412 and depressions 414 of predetermined length as will best be seen in Fig. 12. When the feed roller 404 is opposite the depressed areas 414 of metering roller 398, the rollers do not apply pressure to the tape and no tape is fed to the dial. The rollers do apply pressure to the tape to feed the same only when the lower roller 404 is opposite the elevated or land areas 412 of the upper metering roller 398. The roller 398 rotates in a clockwise direction as shown by the arrow in Fig. 12. In this direction, the first juncture point 416 between a depressed area 414 and an elevated area 412 is a start point and the second juncture point 418 is a stop point and the distance between the start and stop points predetermines the length of tape to be fed or metered to the dial. The roller 398 is fixed upon the hub member on shaft 392 in such a position that a start point 416 contacts the upper adhesive face of the tape T to feed the same when one of the cam followers 276, Fig. 31, drops off the point P of cam member 250, Fig. 30, and the finger rollers 274 clamp the tape against the dial back plate 214.

Figure 15:
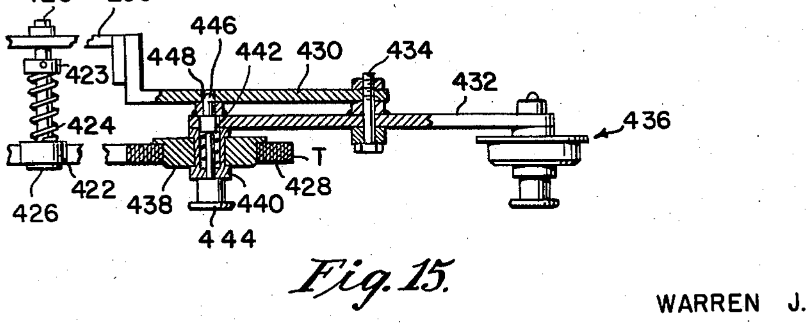
Fig. 15 is a section taken on line 15—15 of Fig. 12.

Fixed upon frame 200 is a further shaft 420 and idled upon one end thereof is an anti-recoil roller 422, Figs. 12 and 15, the tape T passing beneath said roller before passing around the dial, the adhesive face of the tape contacting said roller. A collar 423 is adjustably fixed upon the shaft 420 and a compression spring 424 is interposed between the collar and the roller 422 urging the roller outwardly against a friction plate 426 which is fixed on the shaft 420. When the tape is in position to be cut off, the depressed area of the metering roller 398 is above the feed roller 404 and the clamping finger rollers 274 apply tension to the tape. At the point of cut off, the tape will therefore recoil back to tape supply roll 428. The adhesive face of the tape being in contact with the roller 422 will tend to rotate the latter counterclockwise or opposite to the direction of tape feed. However, this will be prevented because the engagement of the roller 422 with the friction plate 426 will restrain the roller 422 from rotating in the counter-clockwise or recoil direction.

A further bracket 430 is attached to bracket 200 and an arm 432 is pivoted as at 434 to bracket 430 for rotation in a vertical plane. The arm 432 not only mounts the supply roll 428 but also an auxiliary tape supply member 436. The roll 428 is mounted upon a hub member 438 which is rotatable upon a hollow extension 440 of the arm 432. Slidably mounted in the hollow extension is a spring loaded pin 442 which carries a hand knob 444 on one end and a detent 446 on the other, the detent being urged into engagement with a recess 448 in the bracket 430 which fixedly locates the position of the supply roll 428. The construction of the auxiliary member 436 is the same as that of the member just described upon which the supply roll 428 is mounted.

Normally when the tape on the supply roll 428 is exhausted, the machine must be stopped, a new supply roll mounted and the new tape threaded through the machine. With the above construction these operations are obviated. When the supply of tape on the roll 428 gets low, the tape is cut at the top of the roll opposite the point of pull off preferably at a dwell cycle. The tape from the auxiliary roll 436 is then adhered to the tape on the supply roll 428 in advance of the cut off point and the positions of the supply rolls 428 and 436 are then reversed by rotating the arm 432 about its pivot point 434. At this point the depleted supply roll 428 is placed in an inoperative position whereas the auxiliary roll 436 now becomes the tape supply roll without interruption in the operation of the machine.

The operation of the various mechanisms making up the total machine should be obvious to a skilled artisan from the above description. The overall operation is that the main shaft 30 is driven by the motor M at a reduced rate of speed and said main shaft indexes the conveyor shaft 76. The take-offs are primarily from said conveyor shaft 76 so that the card feed mechanism, the conveyor, the taping dial, the tape feed and tape cutter are also simultaneously and synchronously operated. The indexing operation is such that each conveyor carrier moves linearly in a repetitive series of advances and dwells, the objects are fed to the conveyor carriers at dwells, the cutting of the tape occurs at dwells and the application of the tape to the objects also occurs at dwells while the feeding of the tape to the taping dial occurs at advances.

While a preferred embodiment of the invention has been shown and described hereabove, it is understood that a skilled artisan may make minor variations without departing from the spirit of the invention and the scope of the appended claims. Thus, for example, an automatic means may be provided for supplying the objects on the cards in the conveyor carrier as the cards move from the card feed to the taping head.

I claim:

1. A machine for taping objects together comprising a conveyor having object carriers which are movable linearly, a tape applying member rotatably mounted above the conveyor, means simultaneously driving and indexing said conveyor and said tape applying member whereby the linear advances and dwells of said conveyor coincide with the rotary advances and dwells of said tape applying member, clamping means releasably retaining predetermined lengths of tape on said member and means operative at dwells when each length of tape is selectively positioned over the objects in the conveyor carriers to wrap each length of tape held on said member around the objects.

2. The combination of claim 1 and means restraining said tape applying member from turning to the tape wrapping position when the conveyor carrier one index in advance of said position contains no object.

3. A machine for taping objects together comprising a conveyor having object carriers which are movable linearly, a tape applying member rotatably mounted above the conveyor, means simultaneously driving and indexing said conveyor and said tape applying member whereby the linear advances and dwells of said conveyor coincide with the rotary advances and dwells of said tape applying member, clamping means releasably retaining predetermined lengths of tape on said member, means operative at dwells when each length of tape is positioned over the objects to wrap each length of tape held on said member around the top and sides of the objects, and oscillating means operative at the end of the dwells to apply the free ends of each length of tape in overlapped relation against the bottom of the lowermost object.

4. The combination of claim 1 and means applying compressing force upon the objects in the conveyor carrier at the tape wrapping position.

5. The combination of claim 1 and a means operative to eject taped objects from the conveyor carriers at the end of advances.

6. A machine for taping objects together comprising a conveyor having object carriers which are movable linearly, a tape applying member rotatably mounted above the conveyor, means simultaneously driving and indexing said conveyor and said tape applying member whereby the linear advances and dwells of said conveyor coincide with the rotary advances and dwells of said tape applying member, a rotatable tape feed operatively connected to said tape applying member whereby tape is fed to said member during advances, means operatively connected to said tape applying member to cut off predetermined lengths of tape at dwells, clamping means to releasably hold the cut off lengths of tape on said tape applying member, and means operative at dwells when each length of tape is selectively positioned over the objects in the conveyor carriers to wrap each length of tape around the objects, said clamping means holding each length of tape until it contacts the objects.

7. The combination of claim 6 and a means restraining recoil of the tape back to the tape feed when it is cut.

8. The combination of claim 6 and means restraining said tape applying member from turning to the tape wrapping position when the conveyor carrier one index in advance of said position contains no objects.

9. The combination of claim 6 wherein said tape feed includes means permitting change of tape without stoppage of the machine.

10. A machine for taping objects together comprising a conveyor having object carriers which are movable linearly, a tape applying member rotatably mounted above the conveyor, means simultaneously driving and indexing said conveyor and said tape applying member whereby the linear advances and dwells of said conveyor coincide with the rotary advances and dwells of said tape applying member, clamping means releasably retaining predetermined lengths of tape on said member and means operative at dwells when each length of tape is selectively positioned over the objects in the conveyor carriers to wrap each length of tape held on said member around the objects, said tape applying member including a substantially circular head having a plurality of circumferentially spaced grooves opening through the outer surface thereof, each length of tape spanning a groove and being retained thereat by said clamping means, said means to wrap each length of tape around the objects comprising a plunger extending substantially perpendicular to the plane of the carrier and diametrically slidable in said head, said plunger including a tape wrapping member at one end thereof, resilient means urging said one end of said plunger through a groove directly above the objects in the conveyor carrier whereby said member is adapted to contact a length of tape and wrap it around the objects, and means restraining said resilient means so that the latter operates only at each dwell.

11. The combination of claim 10 wherein said restraining means includes a rotating cam and a follower carried by said plunger and contacting said cam, said cam including high and low surfaces and being rotated at such a speed relative to the indexing of said head whereby said high surface acting on said follower urges the plunger against action of said resilient means for the advance of each index and said low surface is contacted by said follower for the dwell of each index during which time said resilient means urges said tape wrapping member through a groove.

12. The combination of claim 11 wherein said tape wrapping member is a pair of spaced flexible fingers adapted snugly to embrace the objects to be taped.

13. The combination of claim 12 wherein said tape wrapping fingers apply tape only around the top and sides of the objects, and means for overlapping the free ends of the tape and securing them to the bottom of the objects, said overlapping means including a vertically extending lever mounted for oscillating movement beneath said head and conveyor carrier at the tape applying position, a pair of spaced wipers at one end of said lever immediately beneath the conveyor carrier and cam means operative on said lever to oscillate the same at the end of a dwell just after said flexible fingers have been withdrawn whereby each wiper moves each free end of the tape across the bottom of the objects.

14. A machine for taping objects together comprising a conveyor having object carriers which are movable linearly, a tape applying member rotatably mounted above the conveyor, means simultaneously driving and indexing said conveyor and said tape applying member whereby the linear advances and dwells of said conveyor coincide with the rotary advances and dwells of said tape applying member, clamping means releasably retaining tape on said member, means operatively connected to said driving and indexing means to cut off a predetermined length of tape at dwells, and means operative at dwells at the object taping position directly above the conveyor carrier to wrap each length of tape around the objects in the carriers.

15. The combination of claim 14 wherein said member includes a substantially circular head having circumferentially spaced grooves opening through the outer surface thereof, said clamping means retaining the tape across the grooves, said cutting means including a knife blade pivotally mounted adjacent said head at a predetermined location and resiliently urged away from said head and cam means operatively connected to said driving and indexing means to energize said switch and cause the knife blade to move against said head and cut the tape on one side of each groove at dwells.

16. A machine for taping objects together comprising a conveyor having object carriers which are movable linearly, a tape applying member rotatably mounted above the conveyor, means simultaneously driving and indexing said conveyor and said tape applying member whereby the linear advances and dwells of said conveyor coincide with the rotary advances and dwells of said tape applying member, clamping means releasably retaining predetermined lengths of tape on said member, means operative at dwells to eject a length of tape and wrap it around the objects at a predetermined tape wrapping location immediately above the objects in the carriers, and means restraining said member from turning to the tape wrapping location when there are no objects in a conveyor carrier one index position in advance of the tape wrapping location.

17. The combination of claim 16 wherein said restraining means comprises a switch mounted one index position in advance of the tape wrapping position and having a movable and a fixed contact and a pivoted feeler arm connected to said movable contact, and a clutch mechanism operatively connected to said tape applying member and to said switch, whereby when said feeler arm touches the objects in the carriers, at the switch position, the contacts close, the clutch mechanism is engaged and the tape applying member continues to rotate whereas when there are no objects in the carrier at the switch position, the feeler arm fails to close the contacts, the clutch mechanism is disengaged and the tape applying member is restraining from rotating.

18. A machine for taping objects together comprising a conveyor having object carriers which are movable linearly, a tape applying member rotatably mounted above the conveyor, means simultaneously driving and indexing said conveyor and said tape applying member whereby the linear advances and dwells of said conveyor coincide with the rotary advances and dwells of said tape applying member, clamping means releasably retaining predetermined lengths of tape on said member, means operative at dwells when each length of tape is selectively positioned over the objects in the conveyor carriers to wrap each length of tape around the objects, and means operatively connected to said driving and indexing means whereby objects to be taped are fed to the conveyor carriers at dwells; said object feeding means including a magazine containing objects mounted adjacent the conveyor, a vacuum pump, a conduit connected to said pump and having an object grasping member at its end, means carrying said object grasping member and pivoted so that said object grasping member can turn from a position adjacent the feed end of said magazine to a position immediately above the conveyor, a valve in said conduit and means operatively connected to said driving and indexing means and to said means carrying said object grasping member whereby at advances said valve is closed and said object grasping member is adjacent the feed end of said magazine and at dwells said object grasping member is immediately above the conveyor in the object depositing position and said valve is opened to break the vacuum.

19. A machine for taping objects together comprising a conveyor having object carriers which are movable linearly, a tape applying member rotatably mounted above the conveyor, means simultaneously driving and indexing said conveyor and said tape applying member whereby the linear advances and dwells of said conveyor coincide with the rotary advances and dwells of said tape applying member, means feeding tape to said member, clamping means releasably retaining predetermined length of tape on said member, and means operative at dwells to eject a length of tape and wrap it around objects at a predetermined tape wrapping location immediately above the objects in the carrier.

20. The combination of claim 19 wherein said tape applying member is a substantially circular head haivng circumferentially spaced grooves adapted to be spanned by tape and there held by said clamping means, said tape feeding means comprising a rotatably mounted tape supply roll, a pair of coacting rotatably mounted rollers through which the tape passes as it approaches said circular head, one of said rollers being full circumference and the other having lands and depressed areas, and means operatively connecting said other roller to said driving and indexing means whereby said lands contact the tape and positively drive the same onto said head only at advances whereas at dwells the tape is disposed between a depressed area of said other roller and said full circumference roller at which time the tape is not driven.

21. The combination of claim 20 and means to adjust the distance between said full circumference roller and said other roller.

22. The combination of claim 21 wherein said clamping means is pivoted upon said tape applying member and means acting upon said clamping means to pivot the same out of the path of the tape at the location where the tape is fed onto said member, said last-named means also acting to pivot said clamping means back to said tape applying member after the tape has been cleared.

23. The combination of claim 22, wherein said clamping means includes a unit pivoted across each groove having fingers overlying the periphery of said head on both sides of each groove and resilient means urging said fingers against the periphery of said head.

24. The combination of claim 23 wherein said means acting upon said clamping means to pivot the same comprises a cam having a land area at a predetermined portion thereof and a cam follower carried by each clamping unit and contacting said cam, the rotation of the head and the location of the land area being such that the latter contacts the follower and pivots the clamping unit against action of said resilient means so that the fingers move outwardly away from the periphery of said head to clear the tape only when the clamping unit approaches the position where tape enters upon the periphery of said head.

25. The combination of claim 19 wherein said tape feeding means includes a supporting bracket adjacent said tape applying member, a bar pivoted intermediate its ends on said bracket, a hub member secured adjacent each end of said bar and mounting a main tape feed roll and an auxiliary tape feed roll respectively, a detent in said bracket and a spring urged ball in each hub member adapted to enter said detent, whereby after attaching the tape of the auxiliary roll to that of the main roll, said bar may be pivoted to reverse the positions of the rolls and thereby permit additional tape to be fed without stopping operation of the machine.

26. The combination of claim 25 and a means operatively connected to said driving and indexing means to positively drive tape from one of said tape feed rolls onto said tape applying member only at advances.

27. A machine for taping objects together comprising a conveyor having object carriers which are movable linearly, a tape applying member rotatably mounted above the conveyor, means simultaneously driving and indexing said conveyor and said tape applying member whereby the linear advances and dwells of said conveyor coincide with the rotary advances and dwells of said tape applying member, clamping means releasably retaining predetermined lengths of tape on said member, means operative at dwells to remove a length of tape from said clamping means and wrap it around objects at a predetermined tape wrapping location immediately above the objects in the carrier, and means positively ejecting the taped objects from the carrier.

28. The combination of claim 27 wherein said ejecting means comprises a circular plate over which the conveyor passes, a plurality of radially extending ejector bars slidably mounted on said plate, resilient means urging said bars outwardly beyond the periphery of said plate and means acting against said resilient means to restrain movement of said ejector bars save one at a predetermined discharge location of said plate, said one ejector bar pushing against the taped objects at said location to remove it from the conveyor carrier.

29. A machine for taping objects together comprising a conveyor having object carriers which are movable linearly, a tape applying member rotatably mounted above the conveyor, means simultaneously driving and indexing said conveyor and said tape applying member whereby the linear advances and dwells of said conveyor coincide with the rotary advances and dwells of said tape applying member, a rotatable tape feed operatively connected to said tape applying member whereby tape is fed to said member during advances, means operatively connected to said tape applying member to cut off predetermined lengths of tape at dwells, clamping means to releasably hold the cut off lengths of tape on said tape applying member, means operative at dwells when each length of tape is selectively positioned over the objects in the conveyor carriers to wrap each length of tape around the objects, said clamping means holding each length of tape until it contacts the objects, and means restraining recoil of the tape back to the tape feed when it is cut, said recoil restraining means comprising a roller mounted for rotation between said tape applying member and said tape feed, the tape passing beneath said roller with its adhesive surface contacting said roller and a friction plate engageable by said roller restraining its movement in a direction opposite to that of the tape feed.

30. A machine for taping objects together comprising an elongated housing, an object feed means mounted at one end of said housing, said one end constituting the feed end, and a tape applying member mounted adjacent to the other end thereof, said other end constituting the discharge end, a conveyor operatively connected to said object feed means and said tape applying member and having carriers movable linearly from the feed end to the discharge end of said housing, said tape applying member being a dial rotatably mounted on said housing above said conveyor, a tape feeding means operatively connected to said tape applying dial to feed tape around the periphery thereof, means operatively connected to said dial to cut off a predetermined length of tape, means carried by said dial operating to wrap the cut tape around the objects when they are directly beneath the tape on the dial, clamping means on said dial releasably holding the cut tape until it contacts the objects, means drivingly indexing said conveyor and taping dial simultaneously and intermittently in a series of alternating advances and dwells whereby the feeding of objects to the conveyor carrier, the cutting of the tape and the application of the tape to the objects occur at dwells and the feeding of tape to the dial occurs at advances, and means restraining said dial from turning to the tape wrapping position where the cut tape is directly above the objects when there are no objects in the conveyor carrier one index position in advance of said tape wrapping position.

31. A machine for taping objects together comprising a tape applying dial mounted for intermittent, indexed rotation on a support, tape feeding means operatively connected to said tape applying dial for feeding tape to said dial, a plurality of clamping means movable with said dial and pivotally connected thereto, each of said clamping means being spring-pressed toward a predetermined clamping position and having a cam follower operatively associated with a stationary cam, said cam being adapted to act on said followers to pivot said clamping means away from said clamping positions when said followers engage certain portions of the cam surface of said cam, cut-off means operatively associated with said dial for cutting off predetermined lengths of said tape held on said dial, a wrapping means operatively connected to said dial and radially movable relative thereto toward and from a wrapping station adjacent one portion of the periphery of said dial, said wrapping means being constructed and arranged to remove said lengths of tape from said clamping means on said dial and to overlap said lengths of tape around an object held in its path as it moves toward said wrapping station, drive means for simultaneously moving said dial, tape feeding means, clamping means and wrapping means in predetermined timed relationship, indexing means operatively connected to said dial for imparting indexing movement thereto, and selectively operable clutch means for engaging and disengaging the dial from operative connection with said drive means.

32. A machine for taping objects together comprising a tape applying dial having an annular, centrally apertured tape feed plate mounted for intermittent, indexed rotation on a support, tape feeding means operatively connected to said feed plate for feeding tape thereto, said feed plate including a plurality of circumferentially spaced grooved areas on the periphery thereof, tape clamping means pivotally mounted on said feed plate in operative relation to each of said grooved areas, each of said grooved areas including a pair of opposed flanges in which are pivotally journaled the opposed ends of a shaft, said shaft being connected to a bifurcated member comprising the body portion of the corresponding clamping means, said body portion including a web portion from opposite sides of which project the ends of the corresponding shaft, said bifurcated member having opposed legs on opposite sides of said web portion, said legs constituting clamping fingers, a roller on each clamping finger, a cam follower on said web portion between said clamping fingers, spring means on the shaft of each clamping means, said spring means urging said clamping fingers inwardly against one surface of said feed plate, said feed plate being rotatable about a fixed cam member positioned within the central aperture of said feed plate, said cam followers on said clamping means bearing against said cam member during rotation of said feed plate, said cam member having a differentially contoured cam surface including a first cam surface area which, when engaged by said cam followers, acts to pivot the fingers of the corresponding clamping means, against the tension of its spring means, to a position overlying the position assumed by a strip of tape fed to said feed plate by said tape feeding means, a second cam surface area which, when engaged by said cam followers, acts to pivot the fingers of the corresponding clamping means back to an intermediate position wherein unpressurized contact is adapted to be maintained between said fingers and said tape, and a third cam surface area which, when engaged by said cam followers, acts to pivot the fingers of the corresponding clamping means to a positive gripping position under the tension of the corresponding spring means, cut-off means operatively connected to said dial for cutting off predetermined lengths of tape held by said clamping means, a wrapping means operatively connected to said dial and radially movable relative thereto toward and from a wrapping station adjacent one portion of the periphery of said dial, said wrapping means being constructed and arranged to remove said lengths of tape from said dial and overlap said lengths of tape around an object to be wrapped when said wrapping means moves radially of said dial toward said wrapping station, and drive means for simultaneously moving said feed plate, clamping means, cut-off means and wrapping means in predetermined, time relationship with each other.

References Cited in the file of this patent

UNITED STATES PATENTS

| | | |
|---|---|---|
| 2,223,017 | Abrams | Nov. 26, 1940 |
| 2,564,594 | Clarke | Aug. 14, 1951 |

FOREIGN PATENTS

| | | |
|---|---|---|
| 407,686 | Great Britain | Mar. 20, 1934 |